3,178,359
METHOD OF LIBERATING THE CONTENTS OF MICROBIAL CELLS
Elmer A. Weaver, Main St., Spring Mount, Pa.
No Drawing. Filed Jan. 24, 1963, Ser. No. 253,754
1 Claim. (Cl. 195—2)

This invention relates to the production of new substances produced by the liberation of the contents of organic cells, and it particularly relates to the liberation of the contents of such cells by the action of certain liberating agents on the cells which causes these cells to lose their morphological features. This application constitutes a continuation-in-part of applicant's co-pending application Serial No. 845,331, filed October 9, 1959, now Patent No. 3,088,879, dated May 7, 1963.

The aforementioned co-pending application was specifically concerned with the use of mycelium bearing microbial cells, and more particularly with fungi, as the raw material, while papain was disclosed as the liberating agent. As described in that application, the microbial cells were contacted with the papain which acted to initiate the reaction under certain conditions of acidity and temperature, namely within the pH range of about 4.3 to 6.3 and within the temperature range of about 5° C. to about 85° C. The reaction was described as being initiated by the action of the active principles of papain whereby the microbial cells were disintegrated and the contents thereof liberated. As a result, what originally started as a solid or amorphous mass became converted to a liquid material termed cell components concentrate. Furthermore, it was unexpectedly discovered that once the reaction was initiated by contacting the fungi with the papain materials under the proper conditions, the reaction was self-propagating in that it only required further additions of fungi to the reaction mixture to cause liberation of the contents of these additional fungi.

In the aforementioned co-pending application, only papain, an extract of a melon type fruit plant having aerial borne terminal crowns with palmately-lobed leaves, was specifically disclosed as an operative liberating or initiating agent, it being stated that even bromelin, an enzyme complex in the same grouping as papain, was found to be ineffective. It has now been discovered that not only is bromelin also effective for this purpose but that proper extracts from the propagating portions of spermatophytes generally, as well as from vertebrate animals and thallophytes are operative for this purpose. By "propagating portions" for the spermatophytes or seed-bearing plants is meant those portions through which the sap flows or which can be considered part of the sap system. In some plants, such as the apple tree, this would include the fruits, the seeds, the trunk, bark, leaves, etc. In other plants, such as the potato, this would include the root. It would also include the seeds and stalks of grains such as wheat, barley, etc.

The extracts obtained from the aforesaid spermatophytes may be expressed from the skins, seeds, rinds, bark, etc., or may be obtained directly from the sap itself.

The "propagating portions" of the vertebrate animals are considered to be the blood stream and those parts of the body through which the blood flows or which are a part of the blood system, this would not include such portions of the body as the fingernails, tooth enamel, etc.

The "propagating portions" of the thallophytes or microbial cells constitute extracts of the cells themselves.

It has, furthermore, now been discovered that, in addition to the mycelium bearing or filamentous type of microbial cells, the non-mycelium bearing or non-filamentous type cells may be used as the raw material since these latter type cells may also be caused to lose their morphological features and liberate their contents when properly treated with the aforementioned extracts. Therefore, in addition to such mycelium bearing types as fungi, actinomycetes and filamentous types of yeast, it is also possible to use such non-mycelium bearing types as bacteria and non-filamentous types of yeast.

The procedure for fluidizing the cells is generally the same as described in the aforesaid co-pending application. However, the operative temperature range for the liberation reaction is now known to be between about 3° C. and about 95° C. Preferably, for best and most uniform results and with best yields, the temperature should be between about 5° C. and about 85° C. The reaction begins almost immediately and is often well in progress within one-half to one hour. Preferably the reaction should not be extended beyond about 96 hours, and most preferably not beyond about 48 hours since within such time periods the optimum yields are obtained if the pH is maintained between about 3.0 to 9.0 and preferably between about 4.0 to 8.5. However, it is possible to vary the pH below or above this range if the time factor is varied accordingly.

In the following examples, as embodied in the following Tables 1, 2 and 3, Saccharomyces cells, as commercially available in Baker's yeast, were used as representative of the non-mycelial type of microbial cells while the fruiting structures of edible mushrooms and *Penicillium chrysogenum* cells were used as representative of the mycelial bearing type of microbial cells. The liberating or initiator agents of the spermatophyte type were obtained from the expressed juices of the outer rinds of apples, oranges and grapefruits, the skins of carrots, potatoes and turnips and the whole kernels of barley malt. Commercially available plant extracts used included papain (papaya tree sap), ficin (fig tree sap), bromelin (pineapple plant sap) and pinquinan (a pineapple plant sap of a different variety). As an example of the vertebrate animal type of liberating agent, chicken viscera was used. The chicken viscera constituted the alimentary canal of the chicken with appendages. The thallophyte type of liberating agent was represented by cellulase (a fungus extract), by liquefied *Penicillium chrysogenum* and by keratinase (an extract of actinomycetes.)

The source materials of the liberating or initiator agents were carefully cleaned of all foreign substances before use when other than commercially available extracts were used. For example, the fruits and vegetables were all washed with soap and water followed by thorough rinsing, while the chicken viscera was also thoroughly washed and rinsed and the bowels were emptied before use. After being cleaned, the particular fruit, vegetable, chicken viscera, etc. being used, was place in a Waring type blendor with the rotor running at high speed for about one minute. Water was added, where necessary, to make the mixture fluid and to obtain a completely homogeneous, easily handled product. This was, in each case, carried out at room temperature and pressure. Insofar as concerned the thallophytes such as the liquified *Penicillium chrysogenum*, these extracts were prepared in the same manner as set forth in Example 1 of the aforesaid co-pending application Serial No. 845,331. In this respect, the so-called "cell components concentrate," the preparation of which was disclosed in that example, was used in the present instance as the liberating or initiator agent.

In each example, the action of the liberating or initiator agent on the microbial cells was tested during a period of 24 hours, at a pH of between 4.0 and 8.5, using sodium hydroxide and hydrochloric acid for adjustment toward either the alkaline or acid side. In each example, furthermore, the action or "incubation" was carried out at room temperature (about 24° C.). The degree of activity of activity was evaluated on the basis of the rapidity with which loss of morphological features occurred, as determined by direct microscopic examination.

In some instances, the cell walls of the microbial cells being treated were observed by microscopic examination to remain as thin shells for hours. In other instances, fluidity changes (from high to low viscosity) were noted to occur in minutes. Generally, it was observed that when the microbial cells began to adhere to each other it signified the beginning of their disintegration. Disappearance of the gross morphological features of the microbial cells was usually accompanied by the presence of amorphous, gelatinous masses, small oil globules, crystalline masses, distorted, wrinkled or shrunken cells and, as where mushrooms were used as the source material, short, needle-shaped sticks averaging about 50 microns in length and about 3 microns in diameter. In some cases, the cell walls were observed to open and assume a sheet-like appearance.

Since no effort was made during the reactions set forth in Tables 1, 2 and 3 to observe aseptic conditions, preservatives such as 0.2% potassium sorbate and 0.05% sodium bisulfite were added to the preparations in order to avoid the development of any foreign microbial cells.

The following tables are provided to serve as specific examples since they set forth the individual reactants, reaction conditions and results. The quantities and procedures were the same as set forth in Example 1 of the aforesaid co-pending application except for the variations specifically set forth above and those which follow.

TABLE NO. 1

*Release of microbial components from non-mycelial microbial cells (Saccharomyces) by various initiator substances*

| Initiator substance source | Percent by weight of initiator substance relative to weight of microbial cells | Initiator substance source class | Degree of activity, pH | | |
|---|---|---|---|---|---|
| | | | 4.0 | 5.0 | 8.5 |
| Grapefruit rind | 20 | Spermatophyte of the Family Rutaceae. | (1) | (2) | (3) |
| Orange rind | 20 | do | (1) | (2) | (3) |
| Barley malt | 5 | Spermatophyte of the Family Gramineae. | (1) | (3) | (3) |
| Papaya tree sap (papain) | 0.5 | Spermatophyte of the Family Caricaceae. | (2) | (3) | (3) |
| Fig tree sap (ficin) | 0.3 | Spermatophyte of the Family Moraceae. | (1) | (3) | (3) |
| Pineapple plant sap (bromelin) | 0.5 | Spermatophyte of the Family Bromeliaceae. | (1) | (1) | (1) |
| Extract of fungus (cellulase) | 0.1 | Thallophyte of the Order Moniliales. | (4) | (3) | (2) |
| Liquified *Penicillium chrysogenum*. | 5 | do | (4) | (1) | (4) |

[1] Low.  [2] Medium.  [3] High.  [4] Negligible.

TABLE NO. 2

*Release of microbial components from mycelial bearing microbial cells (mushrooms) by various initiator substances*

| Initiator substance source | Percent by weight of initiator substance relative to weight of microbial cells | Initiator substance source class | Degree of activity, pH 4.5 |
|---|---|---|---|
| Orange rind | 20 | Spermatophyte of the Family Rutaceae. | (3) |
| Apple rind | 20 | Spermatophyte of the Rose Family Rosaceae. | (2) |
| Potato skin | 20 | Spermatophyte of the Family Solanaceae. | (1) |
| Chicken viscera | 2 | Vertebrate animal | (2) |
| Papaya tree sap (papain). | 0.5 | Spermatophyte of the Family Caricaceae. | (3) |
| Fig tree sap (ficin) | 0.25 | Spermatophyte of the Family Moraceae. | (3) |

[1] Low.  [2] Medium.  [3] High.

TABLE NO. 3

*Release of microbial components from mycelial bearing microbial cells (Penicillium chrysogenum) by various initiator substances*

| Initiator substance source | Percent by weight of initiator substance relative to weight of microbial cells | Initiator substance source class | Degree of activity, pH | | |
|---|---|---|---|---|---|
| | | | 4.0 | 5.5 | 8.5 |
| Grapefruit rind | 20 | Spermatophyte of the Family Rutaceae. | (1) | (3) | (1) |
| Orange rind | 20 | do | (1) | (2) | (1) |
| Carrot skin | 20 | Spermatophyte of the Family Umbelliferae. | (2) | (3) | (1) |
| Turnip skin | 20 | Spermatophyte of the Family Crucifera. | (1) | (3) | (1) |
| Barley malt | 1 | Spermatophyte of the Family Gramineae. | (1) | (3) | (1) |
| Fig tree sap (ficin) | 0.3 | Spermatophyte of the Family Moraceae. | (3) | (3) | (3) |
| Papaya tree sap (papain) | 0.5 | Spermatophyte of the Family Caricaceae. | (3) | (3) | (2) |
| Chicken viscera | 1 | Vertebrate animal | (3) | (3) | (1) |
| Extract of actinomycete (keratinase). | 1 | Thallophyte of the Order Actinomycetales. | (1) | (1) | (1) |
| Pineapple plant sap (bromelin) | 1 | Spermatophyte of the Family Bromeliaceae. | (1) | (1) | (1) |
| Plant sap (pinquinan) | 5 | Spermatophyte of the Family Bromeliaceae. | (2) | (3) | (1) |
| Extract of fungus (cellulase) | 0.3 | Thallophyte of the Order Moniliales. | (3) | (2) | (1) |

¹ Low.   ² Medium.   ³ High.

It should be noted that, as set forth in the aforesaid co-pending application, when a first batch of cells has been fluidized, accompanied by liberation of their contents, the resulting substance, the so-called "cell components concentrate," can be used as a very effective nutrient source for the growth of new cells. This is true not only as regards the "cell components concentrate" produced in the manner of that application but also those produced by any of the methods and using any of the reactants disclosed herein.

It should further be noted that the action of the liberating or initiator substances in causing disruption of the morphological features of the microbial cells is concomitant with the destruction of these living microbial cells. The action of these initiator substances on microbial cells also points the way to duplication of such action on other types of living cells.

Obviously many modifications and variations of the present invention are possible in the light of the above teachings. It is, therefore, to be understood that within the scope of the appended claim, the invention may be practiced otherwise than as specifically described.

The invention claimed is:

A method of liberating the contents of microbial cells which comprises disrupting the gross morphological features of said cells by contacting said cells, at a temperature of between about 3° C. and 95° C. and at a pH of between about 3.0 and 9.0, with a fluidized initiator substance selected from the propagating portions of the group consisting of grapefruit, orange, barley, fig, pineapple, apple, potato, carrot, turnip, *Penicillium chrysogenum*, keratinase, pinquinan, cellulase and chicken, and then successively adding fresh microbial cells to the reaction mixture at the same temperature and pH to subject said fresh cells to disruption of their gross morphological features by contact with said reaction mixture.

References Cited by the Examiner

UNITED STATES PATENTS

| | | | |
|---|---|---|---|
| 633,867 | 9/99 | Loew | 195—68 |
| 992,254 | 5/11 | Rieck | 195—67 |
| 2,164,914 | 7/39 | Gore et al. | 195—68 |
| 2,190,689 | 2/40 | Torrington | 195—68 |
| 2,422,455 | 6/47 | Wickerham | 195—67 |
| 3,088,879 | 5/63 | Weaver | 195—2 |

OTHER REFERENCES

Dixon et al.: Enxymes Academic Press Inc., publishers, New York, 1958, pages 43, 230 and 654.

A. LOUIS MONACELL, *Primary Examiner.*